United States Patent
Raynal et al.

(10) Patent No.: US 10,082,865 B1
(45) Date of Patent: Sep. 25, 2018

(54) DYNAMIC DISTORTION MAPPING IN A WORN DISPLAY

(71) Applicants: Francois Raynal, Portland, OR (US); Daniel S. Wald, Portland, OR (US)

(72) Inventors: Francois Raynal, Portland, OR (US); Daniel S. Wald, Portland, OR (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 335 days.

(21) Appl. No.: 14/869,933

(22) Filed: Sep. 29, 2015

(51) Int. Cl.
| | |
|---|---|
| G09G 5/00 | (2006.01) |
| G06F 3/01 | (2006.01) |
| G02B 27/01 | (2006.01) |
| G06T 19/00 | (2011.01) |

(52) U.S. Cl.
CPC .......... *G06F 3/013* (2013.01); *G02B 27/017* (2013.01); *G06T 19/006* (2013.01)

(58) Field of Classification Search
CPC .... G06F 3/013; G06F 3/0416; G06F 3/04842; G02B 27/017; G06T 19/006
USPC ...................................... 345/1.1, 8; 715/852
See application file for complete search history.

(56) References Cited

U.S. PATENT DOCUMENTS

| | | | |
|---|---|---|---|
| 2004/0119662 A1* | 6/2004 | Dempski ............... | G01S 3/7864 345/8 |
| 2007/0165942 A1* | 7/2007 | Jin ...................... | H04N 13/0018 382/154 |
| 2011/0007136 A1* | 1/2011 | Miura ................ | H04N 13/0018 348/46 |
| 2014/0002587 A1* | 1/2014 | Aguren ................ | H04N 13/044 348/36 |
| 2014/0372957 A1* | 12/2014 | Keane ..................... | G06F 3/013 715/852 |

* cited by examiner

*Primary Examiner* — Calvin C Ma
(74) *Attorney, Agent, or Firm* — Donna P. Suchy; Daniel M. Barbieri

(57) ABSTRACT

A display distortion correction system and method is for a worn display. The worn display includes an image display. The display distortion correction system includes an eye tracking system configured to provide an eye parameter related to viewing the image display, a memory for storing a distortion map, and a processor configured to provide a distortion map. The processor is configured to provide a first test pattern on the image display, record a first set of eye positions associated with viewing the first test pattern, and provide the distortion map in response to the first set of eye positons.

20 Claims, 4 Drawing Sheets

DYNAMIC DISTORTION MAPPING IN A WORN DISPLAY

BACKGROUND

The inventive concepts disclosed herein relate generally to the field of distortion correction for a head up display (HUD) in an aircraft. A HUD may be used by an operator in an aircraft to allow the operator to have a view of the outside world with superimposed information, such as symbols and images captured by sensors.

Worn HUDs including but not limited to head worn displays (HWDs), such as, helmet mounted displays (HMDs), are used in aircraft applications, both in in-flight applications and in flight simulators. Head worn displays include monocular type displays having a single display area (viewable by one or two eyes) and binocular type displays having separate left and right eye display areas. With a binocular type display, the left eye sees a left eye image display while the right eye sees a right eye image display.

Monocular and binocular displays generally include a distortion map that is used to correct optical distortion. In binocular type displays, the distortion is corrected in the left eye display image and the right eye display image provided by the worn display, such as, an HMD. Generally, the distortion map is generated using a test fixture and one or more test cameras prior to the HMD entering service. The test fixture can include collimating devices, such as telescopes for the eye positions and the camera on the HMD. The test cameras are placed at the expected eye positions and capture test images projected on the left eye image display and the right eye image display. The distortion map is calculated based upon the test fixture camera data.

Distortion after the distortion map is generated can be introduced into the HMD due to creep in mechanical tolerances (e.g., the sizes, spacing, and shapes of optical components change over time, thereby introducing new distortion into the system). Less expensive, flexible molded composite components (e.g., visor/combiners, etc.) can be particularly prone to creep. Conventional HMDs require that an HMD exhibiting excessive distortion due to mechanical creep be returned to the manufacturer for calibration or re-characterization with a new distortion map using the test fixture and camera. Returning the HMD to the manufacturer is expensive and time consuming. Further, using the test fixture with the test cameras at the expected eye position does not allow the HMD to be characterized with respect to a particular user of the HMD.

SUMMARY

In one aspect, embodiments of the inventive concepts disclosed herein are directed to a binocular display system. The binocular display system includes a digital binocular display which includes a left eye image display and a right eye image display. The binocular display system includes a binocular display distortion correction system including an eye tracking system configured to provide an eye parameter related to viewing the left eye image display or the right eye image display and a processor configured to provide a distortion map. The distortion map is provided in response to a first data set associated with the eye parameter when a user views a first test pattern on the left eye image display of the binocular display and in response to a second data set associated with the eye parameter when the user views a second test pattern on the right eye image display of the binocular display.

In a further aspect, embodiments of the inventive concepts disclosed herein are directed to a method of correcting distortion for a binocular worn display including a left eye image display and a right eye image display. The method includes determining first gaze angles using an eye tracker to a first set of symbols on the left eye display, determining second gaze angles using the eye tracker to a first set of symbols on the right eye display, and generating a distortion map for correcting the distortion using the first gaze angles and the second gaze angles.

In a further aspect, embodiments of the inventive concepts disclosed herein are directed to a display distortion correction system for a worn display. The worn display includes an image display. The display distortion correction system includes an eye tracking system configured to provide an eye parameter related to viewing the image display, a memory for storing a distortion map, and a processor configured to provide a distortion map. The processor is configured to provide a first test pattern on the image display, record a first set of eye positions associated with viewing the first test pattern, and provide the distortion map in response to the first set of eye positons.

BRIEF DESCRIPTION OF THE DRAWINGS

Exemplary embodiments will become more fully understood from the following detailed description, taken in conjunction with the accompanying drawings, wherein like reference numerals refer to like elements, and.

DETAILED DESCRIPTION

Referring generally to the FIGURES, systems for and methods of correcting distortion in a worn display are described according to some exemplary embodiments. Monocular and binocular displays can utilize a distortion map that defines coefficients for a polynomial distortion correction algorithm. The methods and systems advantageously match the end user's eye positon relative to a donned display without removing the display from service and provides higher accuracy than is possible using conventional factory calibration in some embodiments. In some embodiments, the systems for and methods of correcting distortion calibrate to notational inter pupillary distance and eye distance from the display. The systems and methods can have the capability to map for both bore sight and distortion in some embodiments.

Figure 1:
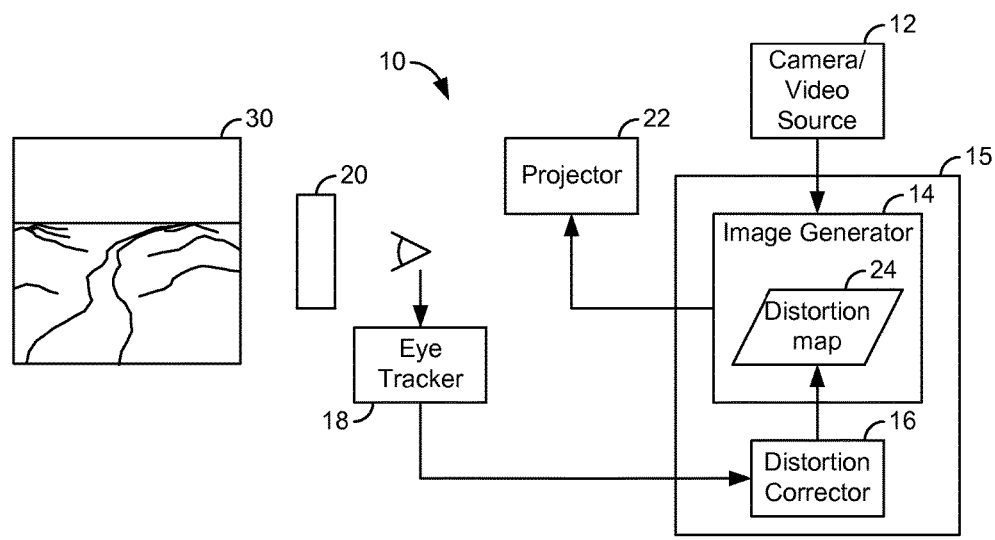
FIG. 1 is a general block diagram of a worn display system including a distortion correction system according to an embodiment of the inventive concepts disclosed herein.

With reference to FIG. 1, a worn display system 10 includes a camera or video source 12, a processor 15, a projector 22, and a combiner 20. A user can wear the worn display system 10 and view a binocular or monocular display image provided on the combiner 20 by the projector 22. In some embodiments, the user simultaneously views a real world scene 30 and the image on the combiner 20. In some embodiments, the worn display system 10 is a helmet mounted display (HMD) or head worn display (HWD).

In some embodiments, an image (e.g., a video image) is captured from the video source 12 and provided on the combiner 20 conformally with the real world scene 30. The processor 15 can also provide additional symbols or indicia on the combiner 20. Distortion associated with optics related to the combiner 20, the projector 22 and the video source 12 is corrected using the processor 15. An eye tracker 18 is used with components of the worn display system 10 to sense the distortion as described below in some embodiments.

The processor 15 includes an image generator 14 and a distortion corrector 16. The distortion corrector 16 is coupled to a distortion map 24 within the image generator 14 and to the eye tracker 18. The distortion corrector 16 provides a test image from the video source 12 and the image generator 14 to the combiner 20 via the projector 22. The user views symbols (e.g., patterns of dots) associated with the test image on the combiner 20. When the user views the patterns of dots or symbols associated with the test pattern, the eye tracker 18 senses eye positon. The eye position is compared to expected eye positon for the symbol on the test pattern and the delta between the actual and the expected eye position is used to provide the distortion map 24 in some embodiments. The processor 15 writes the distortion map 24 (or makes adjustments to the distortion map 24) which is used by the image generator 14 to correct or reduce distortion. The processor 15 uses coefficients defined in the distortion map 24 in a polynomial distortion correction algorithm to correct for distortion in some embodiments. The distortion map 24 can be used to correct distortion using the algorithms associated with the F-35 Gen III helmet mounted display.

In some embodiments, the test pattern is provided in a real world scene 30 and captured by the video source 12 through a collimator and the user views the test pattern via the image generator 14, projector 22 and the combiner 20. In some embodiments, the real world scene 30 is simulated. The user is prompted to gaze at each symbol or pattern of dots in the test pattern for a period of time. The eye tracker 18 records the location associated with the eye viewing each of the symbols and provides the eye location to the processor 15. The positon can be expressed or captured as a gaze angle. In some embodiments, the centroid of gaze angles over the period of time are utilized to provide the distortion map 24. The gaze angles are recorded for a number of symbols in some embodiments.

The processor 15 is a field programmable gate array, digital processor, a graphical processor, a HUD computer, or combinations thereof. The processor 15 includes a computing platform for performing the operations described herein. The image generator 14 and the distortion corrector 16 can be software routines or software modules operating on the computer platform associated with the processor 15. The distortion map 24 can include a memory or other non-transitory medium for storing the distortion map values.

The eye tracker 18 is an eye positon sensing device. The eye tracker 18 determines where the eye is focusing in some embodiments. The eye tracker 18 can be internal or external to a helmet associated with the worn display system 10. In some embodiments, the eye tracker 18 are part of a set of glasses worn by user or are attached to the combiner 20 or are part of a test stand. In some embodiments, the eye tracker 18 includes a right eye sensor and a left eye sensor. In some embodiments, the eye tracker 18 provides a beam to each eye and receives a reflection from each eye with a camera or other sensor to sense eye position in the 10 degree field of view associated with each eye. The eye tracker 18 senses the location of the center of the pupil with respect to head space or with respect to the helmet or other components of the worn display system in some embodiments. The eye tracker 18 is integrated with the worn display system 10 or is attachable to a helmet or visor (e.g., the combiner 20) associated with the worn display system 10 in some embodiments.

In some embodiments, the worn display system 10 is mounted to a test stand that meets with particular characteristics of the worn display system 10 when the eye tracker 18 is used to track the eye positon in some embodiments. For example, the test stand can mate with helmet portions or can interface with portions of the user's face. A test stand similar to the test stand used in bore sighting F-35 Helmet Mounted Displays can be utilized in some embodiments. The test stand can be aligned with the bore sight in some embodiments.

The combiner 20 is any type of optical device for providing images from the image generator 14 to the user. In some embodiments, the combiner 20 is a prismatic combiner, a waveguide combiner, a holographic combiner, a reflective combiner. In some embodiments, the combiner 20 is a visor combiner associated with an HMD. The combiner 20 can be manufactured from a composite material.

The projector 22 is any optical device for projecting an image to the combiner 20. The projector 22 provides collimated images conformally with respect to the real world scene 30 in some embodiments. The projector 22 can include waveguides, fiber optics, prisms, an image source, etc. for projecting the image to the combiner 20.

The video source 12 is a camera or other sensor (e.g., infrared, visible light, radar, etc.). The video source 12 provides a video signal or video data to the processor 15 in some embodiments. In some embodiments, the worn display system 10 includes more than one video source 12.

Figure 2:
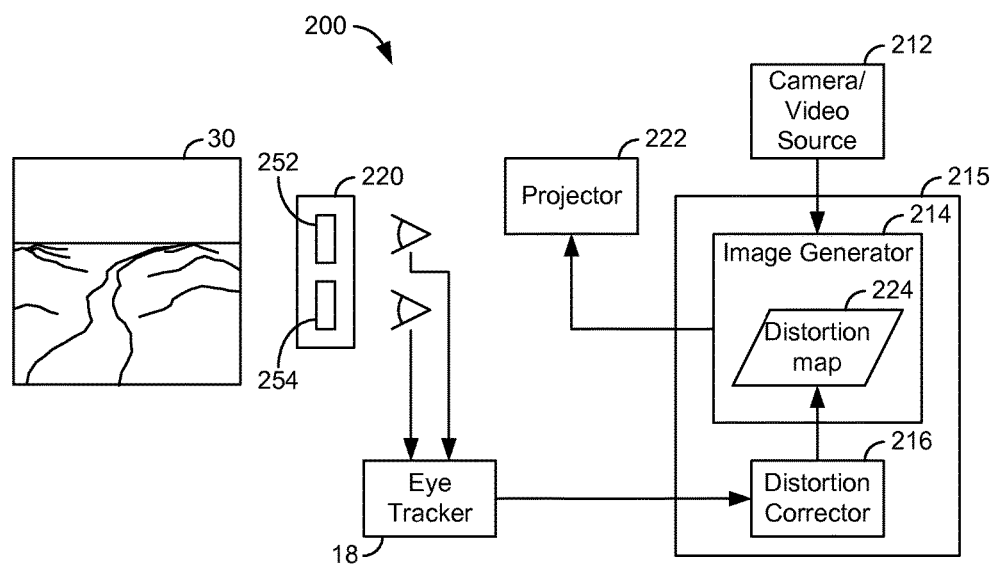
FIG. 2 is a general block diagram of a binocular worn display system including a distortion correction system according to an embodiment of the inventive concepts disclosed herein.
Figure 3:
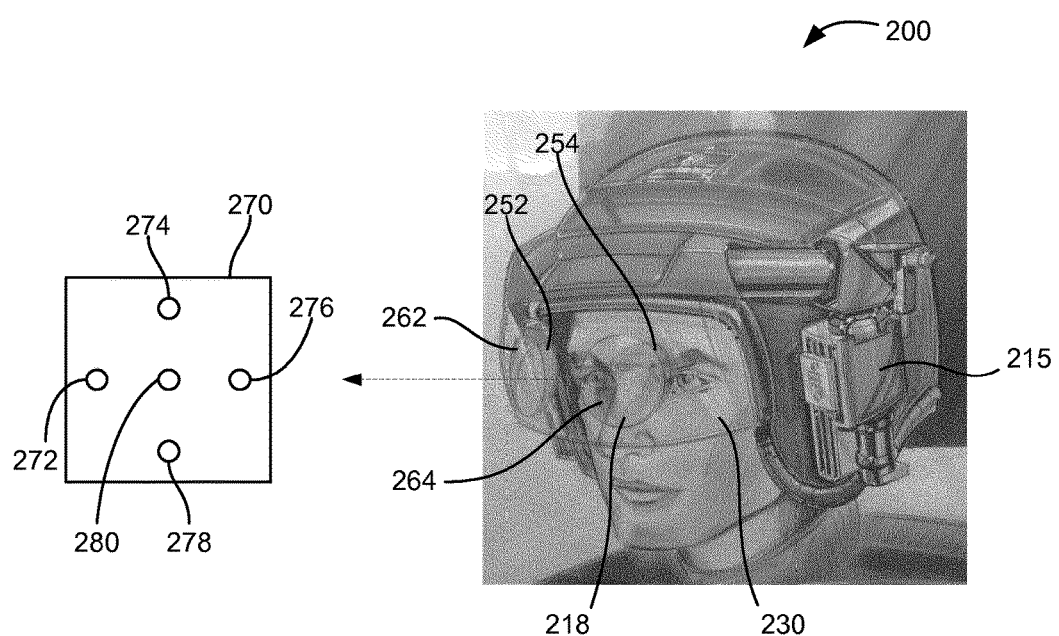
FIG. 3 is a schematic perspective view drawings illustrating the binocular worn display system including the distortion correction system illustrated in FIG. 2 according to an embodiment of the inventive concepts disclosed herein.

With reference to FIGS. 2-3, a worn display system 200 is similar to the worn display system 10 and is embodied as a binocular system, such as, a helmet mounted binocular system. The worn display system 200 includes a combiner 220 similar to the combiner 20, a camera or video source 212 similar to the camera or video source 12, a processor 215 similar to the processor 15, and a projector 222 similar to the projector 22. The processor 215 includes an image generator 214 similar to the image generator 14 and a distortion corrector 216 similar to the distortion corrector 16. The worn display system 200 can be used to view the real world scene 30 and can be used with an eye tracker 218 similar to the eye tracker 18 to provide distortion corrections.

The combiner 220 provides a right eye image display 252 and a left eye image display 254. The right eye image display 252 and left eye image display 254 are provided by the projector 222 on the combiner 220 in response to the image generator 214 The image generator 214 includes a distortion map 224 similar to the distortion map 24. The components of the processor 215, the combiner 220, and the projector 222 are configured for binocular operation and can include a separate channel for each eye. In some embodiments, stereoscopic imaging and 3D imaging are provided using the combiner 220.

The eye tracker 218 includes sensors for sensing positons the left eye and the right eye. The distortion corrector 216 operates similar to distortion corrector 16. In some embodiments, the distortion corrector 216 drives a test pattern to be viewed by the left eye of the user on the left eye image display 254. The user is prompted to gaze at each symbol of the test pattern for an extended period of time (e.g., approximately 10-15 seconds). The centroid of the gaze angle sensed by the eye tracker 218 can be used as a variable input into the distortion map 224. The use of data directly associated with the user's eye positions helps to ensure that bore sight and the distortion map 224 are customized for each user in some embodiments. In some embodiments, the user is directed to switch back and forward between various points and multiple measures of the gaze angles are taken. In some embodiments, the extended period of time is used to achieve more accurate eye tracking in light of eye movement while viewing the fixes symbol. In some embodiments, the user is directed to switch back and forward between various points rapidly and multiple measures of the gaze angles are taken.

Once distortion mapping is complete using the left eye image display 254, distortion corrector 216 drives a test pattern for the right on the right eye image display 252. The user is prompted to gaze at each of the symbols for extended period of time. The centroid of the gaze angle associated with or sensed by the eye tracker 218 is used as variable input into the distortion map 224. In some embodiments, a more accurate augmented reality overlay is provided by the worn display system 200 due to mapping various eye positons. After the gaze angles to the left eye and the right eye are used to provide the distortion map 224, a binocular distortion pattern is displayed and evaluated to allow for fine adjustments.

With reference to FIG. 3, the worn display system 200 can provide a test pattern 270 including symbols 272, 274, 276, 278, and 280 provided a various positions in the left eye image display 254 or right eye image display 252. The eye tracker 218 can include a right eye tracker 262 and a left eye tracker 264 to sense gaze angles associated with symbols 272, 274, 276, 278, and 280 on the test pattern 270. Although a cross shaped test pattern having symbols 272, 274, 276, 278, and 280 is shown on the test pattern 280, other shapes and sizes of symbols can be utilized.

When the test pattern 270 is provided on the right eye image display 252 and the left eye image display 254 is turned off, the right eye position is tracked by the right eye tracker 262 in some embodiments. When the test pattern 270 is provided on the left eye image display 254 and the right eye image display 252 is turned off, the right eye position is determined using the left eye tracker 264 in some embodiments.

Figure 4:
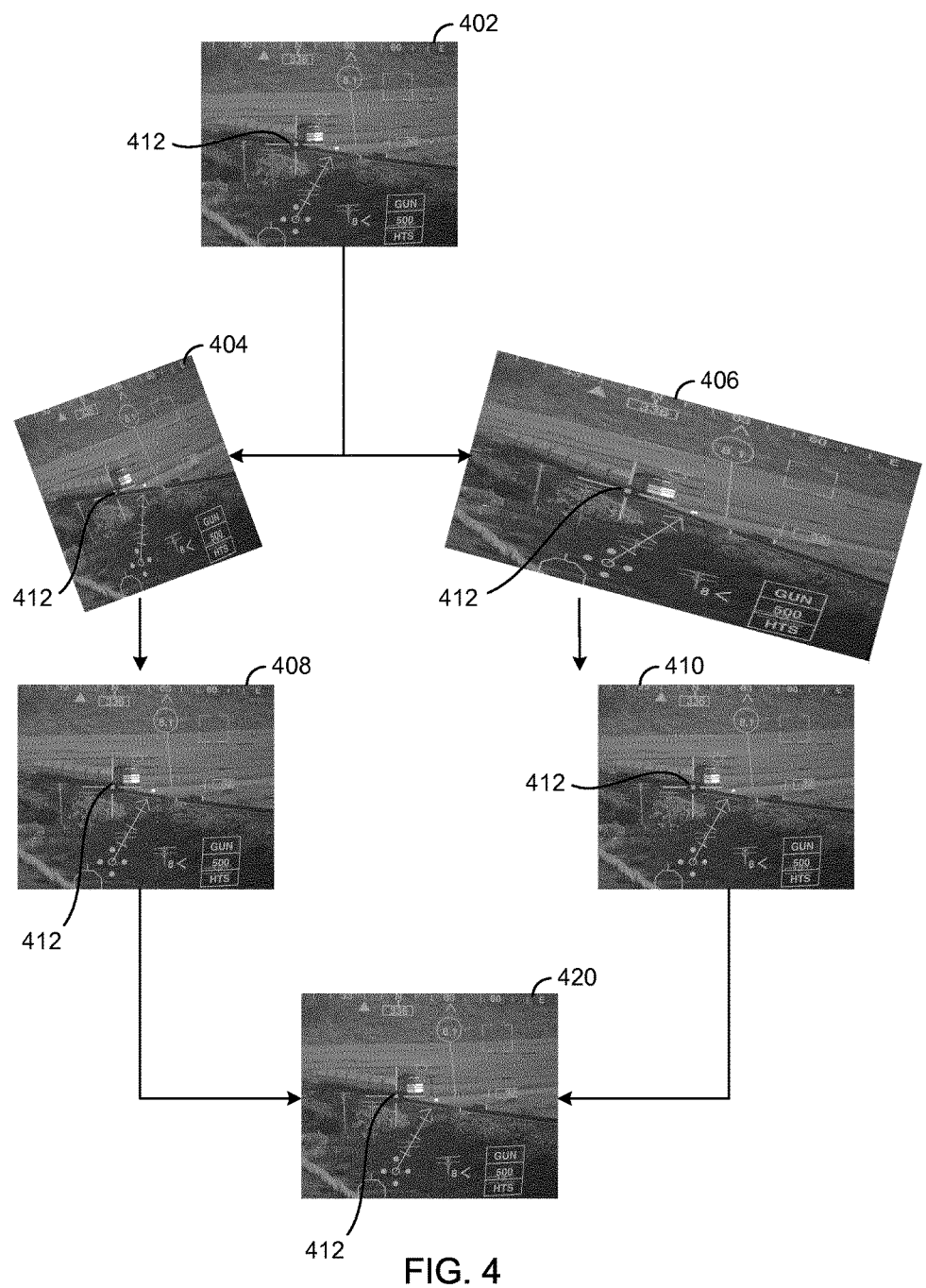
FIG. 4 is a schematic illustration showing images associated with the binocular worn display system including the distortion correction system illustrated in FIG. 2 according to an embodiment of the inventive concepts disclosed herein.

With reference to FIG. 4, an image 402 captured by the camera or video source 212 is provided on the combiner 220 by the image generator 214 via the projector 222 as a left eye image 404 and a right eye image 406. The image generator 214 can provide additional symbols in augmented reality and overlay the captured video image with augmented reality features. The right eye image 406 of the right eye channel is provided on the right eye image display 252 and the left eye image 404 of the left eye channel is provided on the left eye image display 254. The right eye image 404 and the left eye image 406 include distortion. Distortion can have various effects including improper rotation of image, improper magnification of an image, magnification in one access with different magnification in another axis, shape distortion, size distortion, etc. In addition, multiple effects of distortion can be included in the right eye mage 404 and the left eye image 406. The distortion can be a result of mechanical creep associated with optics of the worn display system 200. The image generator 214 using the distortion map 224 uses distortion correction to match the real world scene 30 as seen through the combiner 220 (e.g., the image 402) captured by the camera or video source 212.

As an example, a location 412 in the right eye image 410 and the left eye image 408 is located at a different place in each of the images 408 and 410 (e.g., due to warping or other distortion). The location 412 for an ideal image based on initial calibration in the factory is known so deltas in position can be accounted for mathematically and used to update the distortion map 224. Using this methodology with the human eye (acting as the camera associated with initial factory calibration) brings the images 410 and 408 back into proper distortion alignment for an accurate depiction of the real world.

Updating the distortion map using eye tracker type calibration as described above allows the distortion correction to match real world scene after mechanical creep that occurred after factory calibration. The image generator 214 using the distortion map 224 provides the right eye image 410 on the right eye image display 252 and the left eye image 408 on the left eye image display 254 which is viewed by the user as a unified image 420. The location 412 in the images 408 and 410 is at the same location in some embodiments.

Figure 5:
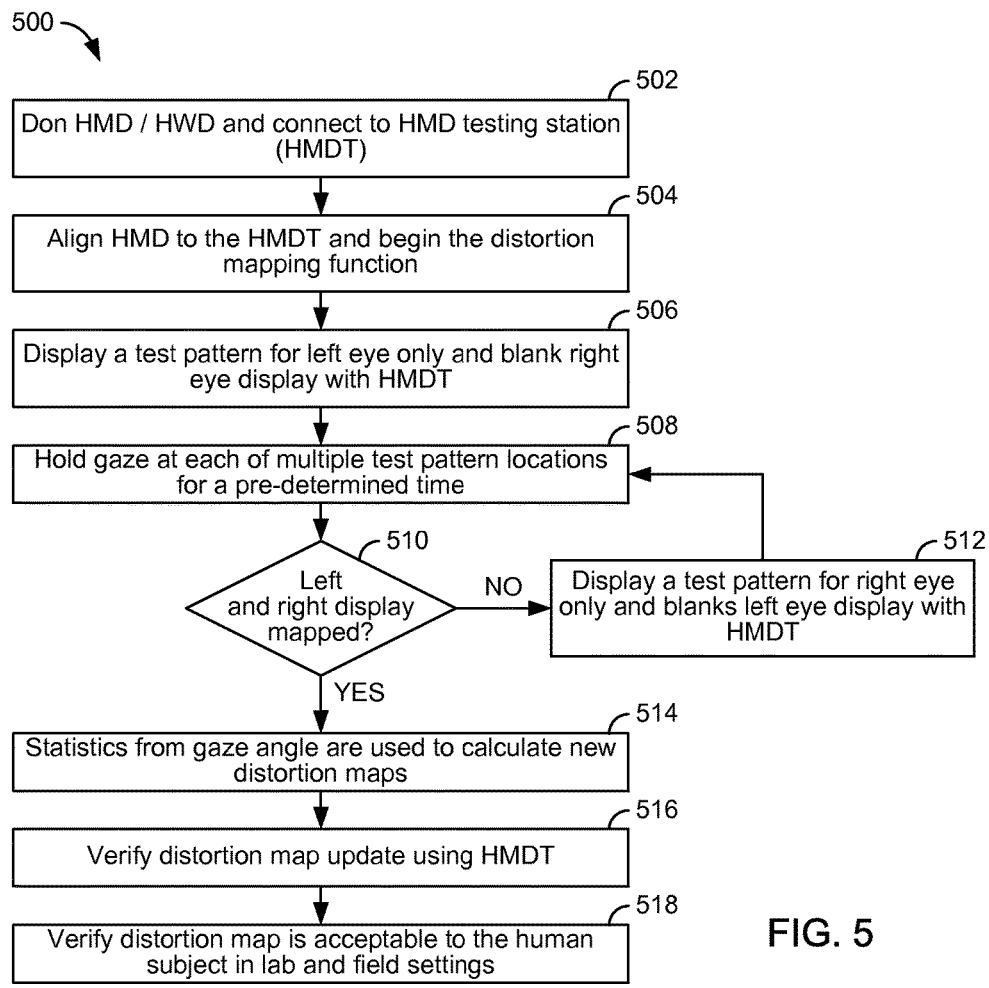
FIG. 5 is a flow diagram showing a distortion correction operation for the worn display system illustrated in FIG. 2 according to an embodiment of the inventive concepts disclosed herein.

With reference to FIG. 5, the worn display system 200 can use a flow 500 to correct distortion. The flow 500 can be operated in the field to update a distortion map or provide a new distortion map (e.g., the distortion maps 224 (FIG. 1)). At an operation 502, the user of the worn display system 200 dons the worn display system 200 and connects to a testing station.

At an operation 504, the wearer aligns the worn display 200 to the testing station and begins the distortion mapping function. The testing station ensures alignment of the worn display system 200 to the user and the environment in some embodiments. At an operation 506, the image generator 214 displays a test pattern for the left eye only and blanks the right eye image display 254. At an operation 508, the wearer holds an eye gaze at each of the multiple of test pattern locations for a predetermined time. At the operation 508, the gaze angles sensed by the eye tracker 218 are recorded. The test pattern locations include a matrix of nine to fifteen different points in some embodiments. At an operation 510, the worn display system 200 advances to an operation 512 if the right eye has not been subjected to the test pattern. At the operation 512, the image generator 214 displays the test pattern for the right eye on the right eye image display 252 and blanks the left eye image display 252. After the operation 512, the distortion corrector 216 advances to the operation 508.

At the operation 510 if the left and right eye image displays 252 and 254 have been mapped, the worn display system 200 advances to an operation 514. At the operation 514, the distortion corrector 216 uses statistics from the recorded gaze angles to calculate a new distortion map for storage as the distortion map 224. Statistics from the gaze angle samples over time are used to reduce errors in some embodiments. Statistics and/or filters are used to obtain an average of the gaze angle for each location in some embodiments. As the user gazes at a pattern, eye movement or dithering can occur during the period of time. By using a number of samples over the period of time, a more accurate indication of the gaze angle is obtained in some embodiments.

At an operation 516, the distortion corrector 216 verifies the distortion map 224 update using a discrete testing station. At an operation 518, the user verifies that the distortion map is acceptable to the human subject in the lab and in the field settings. In some embodiments, the user can view far away objects such as a mountain range or other outside objects using the camera or image source 212 and the combiner 220 to verify that the distortion is acceptable. Adjustments for alignment to the real world scene 30 can be made at the operation 518. Lab settings can utilize a pattern of light emitting diodes (LEDs), a collimated display, or other test images which can be viewed by camera or video source 212 to determine if the distortion map 224 is acceptable.

Figure 6:
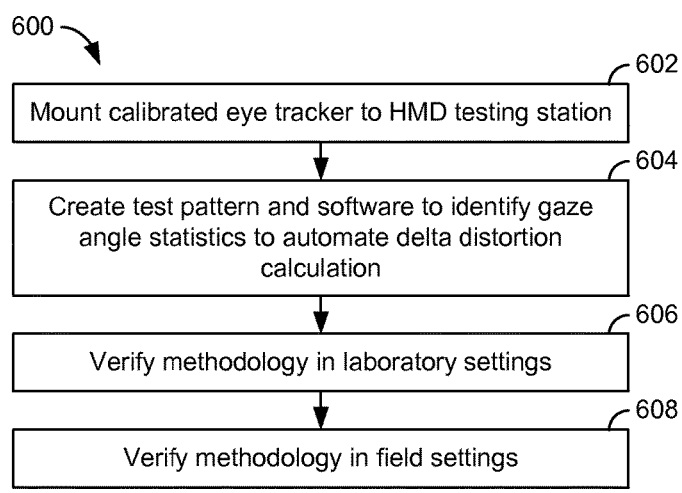
FIG. 6 is a flow diagram showing a distortion correction operation for the worn display system illustrated in FIG. 2 according to an embodiment of the inventive concepts disclosed herein.

With reference to FIG. 6, a flow 600 can be utilized to map gaze angle statistics to changes in the distortion map 224. At an operation 602, a calibrated eye tracker can be mounted to a testing station. At an operation 604, a test pattern is created with software to identify gaze angle statistics that match distortion calculations (e.g., distortion deltas). The operation 604 can be utilized to automate the gaze angle statistic relationship to changes in distortion data or the distortion map 224 based upon laboratory observations. An operation 606, the methodology can be tested for appropriate changes to the distortion calculation. For example, a warped pattern can be provided to the combiner 20 having known distortion correction parameters which are empirically determined. The known distortion correction parameters can be determined using a conventional alignment test set up with cameras at the assumed eye positions. The distortion correct parameters are determined using flow 500 or other eye tracking methods and compared to the known distortion correction parameters. At an operation 608, the changes to the distortion map 224 can be verified in field settings.

Testing directly using the actual wearer of the HMD allows characteristics associated with human to be accommodated using the distortion map 224 in some embodiments. For example, eye position in the face of the human can vary based upon human user. Further, eye spacing from human to human and eye depth from human to human can vary. In some embodiments, the distortion map 224 serves to quantify the distortion and provide an equal opposite distortion such that distortion is subtracted out of the images.

While the detailed drawings, specific examples, detailed algorithms and particular configurations given describe preferred and exemplary embodiments, they serve the purpose of illustration only. The inventions disclosed are not limited to the specific forms and equations shown. For example, the methods may be performed in any of a variety of sequence of steps or according to any of a variety of mathematical formulas. The hardware, optical and software configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

Some embodiments within the scope of the inventive concepts disclosed herein may include program products comprising machine-readable storage media for carrying or having machine-executable instructions or data structures stored thereon. Such machine-readable storage media can be any available media which can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., signals in space).

What is claimed is:

1. A binocular display system, comprising:
a binocular display comprising a left eye image display and a right eye image display; and
a binocular display distortion correction system comprising an eye tracking system configured to provide an eye parameter related to viewing the left eye image display or the right eye image display, and a processor configured to provide a distortion map, the distortion map being provided in response to a first data set associated with the eye parameter when a user views a first test pattern on the left eye image display of the binocular display and in response to a second data set associated with the eye parameter when the user views a second test pattern on the right eye image display of the binocular display, wherein the first data set comprises an average of gaze angles sensed by an eye tracker associated with a user holding a gaze at a test pattern location over a time period, thereby improving accuracy of the gaze angles in light of eye movement or dither.

2. The binocular display system of claim 1, wherein the first data set comprises gaze angles for a pattern of dots in the first test pattern.

3. The binocular display system of claim 1, wherein the distortion map is a co-efficient map for a digital filter.

4. The binocular display system of claim 1, wherein the distortion map provides bore sight alignment and distortion correction.

5. The binocular display system of claim 1, wherein the processor is configured to provide a binocular test pattern on both the left eye image display and the right eye image display.

6. The binocular display system of claim 5, wherein the distortion map is provided in response to a third data set associated with the eye parameter when the user views the binocular test pattern on the left eye image display and the right eye image display.

7. The binocular display system of claim 1, wherein the binocular display is a helmet mounted display comprising a camera, the left eye image display, and the right eye image display.

8. The binocular display system of claim 1, wherein operational images are provided on the left eye image display and the right eye image display using the distortion map.

9. A method of correcting distortion for a binocular worn display comprising a left eye image display and a right eye image display, the method comprising:
   determining first gaze angles using an eye tracker to a first set of symbols on the left eye image display;
   determining second gaze angles using the eye tracker to a first set of symbols on the right eye image display; and
   generating a distortion map for correcting the distortion using the first gaze angles and the second gaze angles, wherein the distortion map is generated using an average of the first gaze angles sensed by the eye tracker associated with a user holding a gaze over a time period at each of a plurality of locations associated with the first set of symbols on the left eye image display.

10. The method of claim 9, wherein the right eye image display is turned off or blanked when the first gaze angles are determined.

11. The method of claim 10, wherein the left eye image display is turned off or blanked when the second gaze angles are determined.

12. The method of claim 9, wherein the first gaze angles and the second gaze angles are used to determine a first centroid angle and a second centroid angle.

13. The method of claim 9, further comprising:
   determining third gaze angles using the eye tracker to a third set of symbols on the right eye image display and the left eye image display.

14. The method of claim 9, wherein the time period is at least 5 seconds.

15. A display distortion correction system for a worn display, the worn display comprising an image display, the display distortion correction system, comprising:
   an eye tracking system configured to provide eye positions related to viewing the image display;
   a memory for storing a distortion map; and
   a processor configured to provide the distortion map, the processor being configured to provide a first test pattern on the image display, record a first set of the eye positions associated with viewing the first test pattern, and provide the distortion map in response to the first set of the eye positions, wherein the distortion map is provided using an average for each of the first set of the eye positions sensed by the eye tracking system and associated with a user holding a gaze over a time period for the first test pattern.

16. The display distortion correction system of claim 15, wherein the first set of the eye positions are gaze angles.

17. The display distortion correction system of claim 15, wherein the distortion map is a co-efficient map for a digital filter.

18. The display distortion correction system of claim 15, wherein the distortion map provides bore sight alignment and distortion correction.

19. The display distortion correction system of claim 15, wherein the processor is configured to provide a binocular test pattern on the worn display comprised of a left eye display and a right eye display.

20. The display distortion correction system of claim 19, wherein the distortion map is provided in response to a second data set associated with the eye positions when a user views the binocular test pattern on the left eye display and the right eye display.

* * * * *